(12) United States Patent
Lin

(10) Patent No.: US 6,435,344 B2
(45) Date of Patent: Aug. 20, 2002

(54) CASE FOR CONTAINING A DISK CARTRIDGE

(75) Inventor: Chih-Feng Lin, Hsin-Chu (TW)

(73) Assignee: Princo Corp., Hsin-Chu (TW)

( * ) Notice: Subject to any disclaimer, the term of this patent is extended or adjusted under 35 U.S.C. 154(b) by 0 days.

(21) Appl. No.: 09/932,200

(22) Filed: Aug. 17, 2001

(51) Int. Cl.[7] ............................................. B65D 85/57
(52) U.S. Cl. ..................................................... 206/308.3
(58) Field of Search .............................. 206/307, 308.1, 206/308.3, 309, 493; 220/837

(56) References Cited

U.S. PATENT DOCUMENTS

| | | | | |
|---|---|---|---|---|
| 5,385,235 A | * | 1/1995 | Ikebe et al. ............... | 206/308.3 |
| 5,540,328 A | | 7/1996 | Kohtake | |
| 5,570,782 A | | 11/1996 | Kikuchi et al. | |
| 5,881,871 A | * | 3/1999 | Ikebe et al. ............... | 206/308.3 |
| 5,954,198 A | * | 9/1999 | Ikebe et al. ............... | 206/308.3 |
| 5,988,374 A | * | 11/1999 | Funawatari et al. ..... | 206/308.3 |
| 6,095,327 A | * | 8/2000 | Ikebe et al. ............... | 206/308.3 |
| 6,123,190 A | * | 9/2000 | Kuboduka ............... | 206/308.3 |

* cited by examiner

*Primary Examiner*—Luan K. Bui

(57) ABSTRACT

The present invention discloses a case for containing a disk cartridge, in which the disk cartridge is inherently provided with at least one recess formed on a bottom surface thereof, the case comprising an upper case member, a lower case member, a pivoting mechanism, a fastening mechanism and cartridge retaining means. The cartridge retaining means have at least one arm resiliently biasing upward, the at least one arm have two opposing ends with one end thereof extending from the bottom plate of the lower case member and the other end provided with a protrusion. When the disk cartridge is completely inserted into the chamber of the case, the protrusion is adapted to be allocated in the recess formed on the bottom surface of the disk cartridge, whereby securely positioning the disk cartridge in the case.

5 Claims, 3 Drawing Sheets

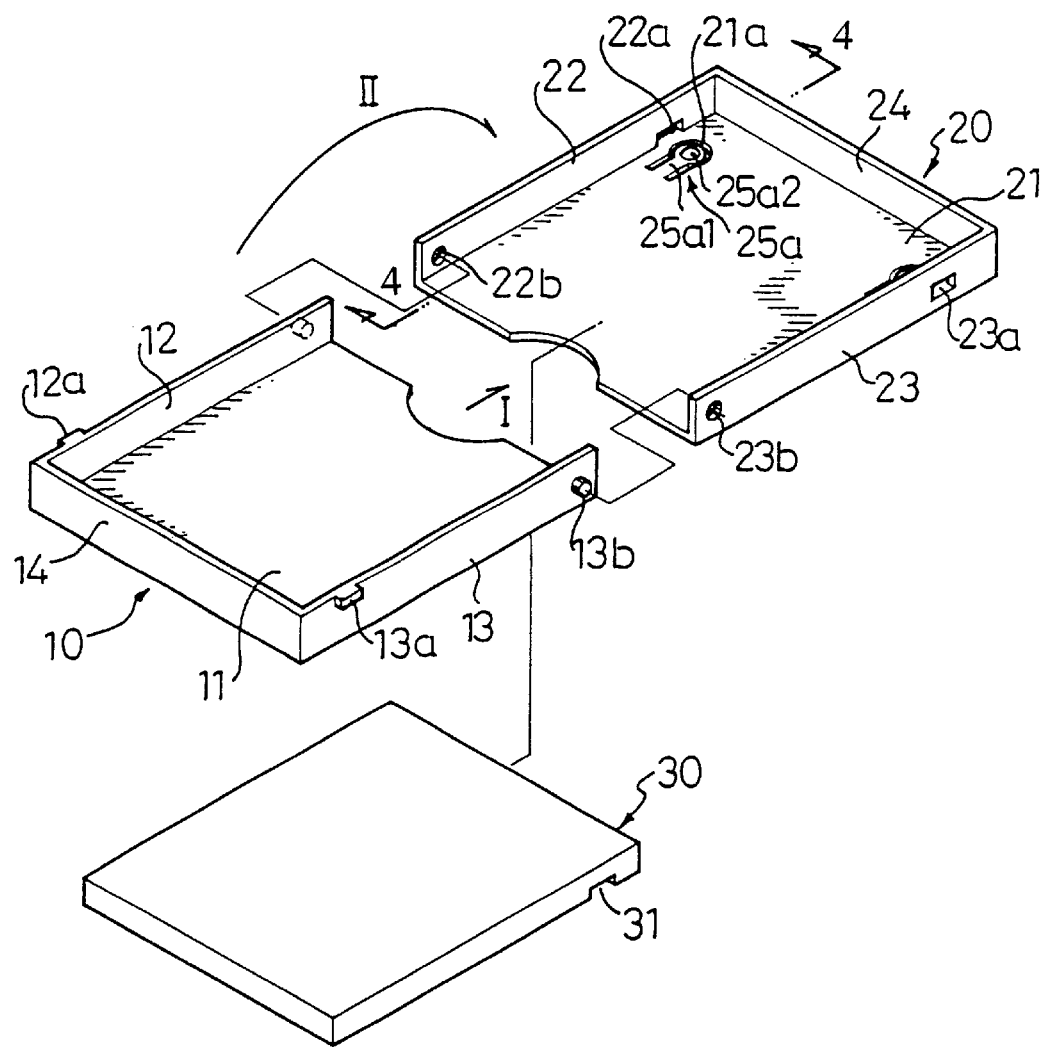
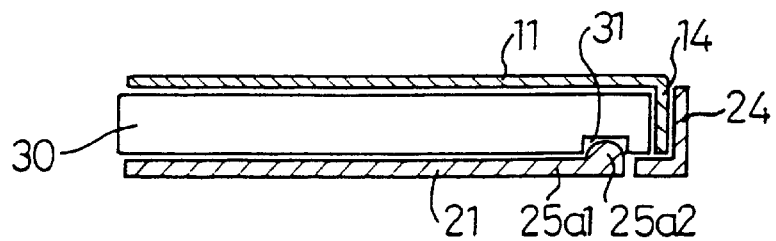
Fig. 3
Fig. 4

CASE FOR CONTAINING A DISK CARTRIDGE

BACKGROUND OF THE INVENTION

1. Field of the Invention

The present invention relates to a case for containing, a disk cartridge, and more particularly, to a case for containing, a mini magneto-optical disk cartridge.

2. Description of the Prior Art

Nowadays, various recording media for saving the image information or data have been widely used, among which the most popular medium is the disk-like recording medium. Following, the technology development, the recording medium has been, advanced from the conventional floppy disk to the CD, and then a mini disk of the magneto-optical disk is getting more and more popular.

Usually, the disk is protected not only in a disk cartridge but also in a case. For example, the CD is protected by a case; however the 3.5-inch floppy disk is protected by covering with a disk cartridge and then stored in a case. U.S. Pat. No. 5,570,782, bulletined in Nov. 5, 1996, discloses a disk cartridge case, which is applied to the containing of a disk cartridge by a cover front member. In addition, U.S. Pat. No. 5,540,328, bulletined in Jul. 30, 1996 by Ricoh Co. Ltd., discloses a slide-type case to contain a disk cartridge, comprising a pair of case piece 2 and 3 joined together in U-shape, as shown in FIG. 1. And, a tongue-like lever 5 is assembled on a sidewall 3c of the case piece 3. An engaging portion 5a, which is formed by bending the lever 5 inwardly, is engaged with a slot portion 8 of the cartridge, and the disk cartridge will be put in the case.

However, the pair of case piece 2 and 3 of the case disclosed in the '328 Patent cannot be precisely joined together. For this reason, there is certain company providing a case with a slideway 3e' disposed on a left sidewall 3c' and a right sidewall 3d' of the lower case piece 3', respectively, as shown in FIG. 2. Thus, the upper case piece 2' can slide from the rear side of the lower case piece 3', and position by the rear sidewall of the upper case piece 2' and the protrusion 3f near the slideway 3e'.

Nevertheless, the above-mentioned cases, as shown in FIG. 2, still have some disadvantages such as difficult assembling, breakable lever, difficult shaping, complicated molding, etc.

SUMMARY OF THE INVENTION

An object of the present invention is to provide a case, with the features that the mold for forming the case can be simply prepared, the components of the case can be easily assembled and the lever for engaging the disk cartridge is not easy to break.

Another object of the present invention is to provide a case having an easy assembling engaging means.

In order to achieve the above objects and to avoid the disadvantages of the prior art, the present invention discloses a case for containing a disk cartridge, in which the disk cartridge is inherently provided with at least one recess formed on a bottom surface thereof, the case comprising:

an upper case member;

a lower case member;

a pivoting mechanism pivoting the lower case member on the upper case member to form a substantially hollow parallelepiped which defines a chamber therein and has an inserting opening, such that the disk cartridge is adapted to be inserted through the inserting opening and received in the chamber, a fastening mechanism, disposed between the upper case member and the lower case member to retain the upper case member with the lower case member;

cartridge retaining means, having at least one arm resiliently biasing upward, the at least one arm having two opposing ends with one end thereof extending from the bottom plate of the lower case member and the other end provided with a protrusion;

Therefore, when the disk cartridge is completely inserted into the chamber of the case, the protrusion is adapted to be allocated in the recess formed on the bottom surface of the disk cartridge, whereby securely positioning the disk cartridge in the case.

Since the width of the arm will not be restricted by the height of the sidewall, the lever of the present invention has stronger strength and resilience and is not easy to break. Moreover, the structure of the cartridge retaining means of the present invention is very simple and the arm flipping orientation is same as the mold releasing orientation. Thus, the mold of the case of the present invention can be easier prepared. Furthermore, the arm of the cartridge retaining means is disposed on the top or bottom plate, so that the molding and mold releasing are facilitated.

The foregoing and other objects and advantages of the invention and the manner in which the same are accomplished will become clearer based on the following detailed description taken in conjunction with the accompanying drawings.

BRIEF DESCRIPTION OF THE DRAWINGS

FIG. 3 depicts a perspective view of the case of an preferred embodiment according to the present invention, and FIG. 4 depicts a sectional view taken along line 4—4 of FIG. 3, in which the upper case member and the lower case member are joined and the disk cartridge is inserted.

DETAILED DESCRIPTION OF THE INVENTION

Figure 1:
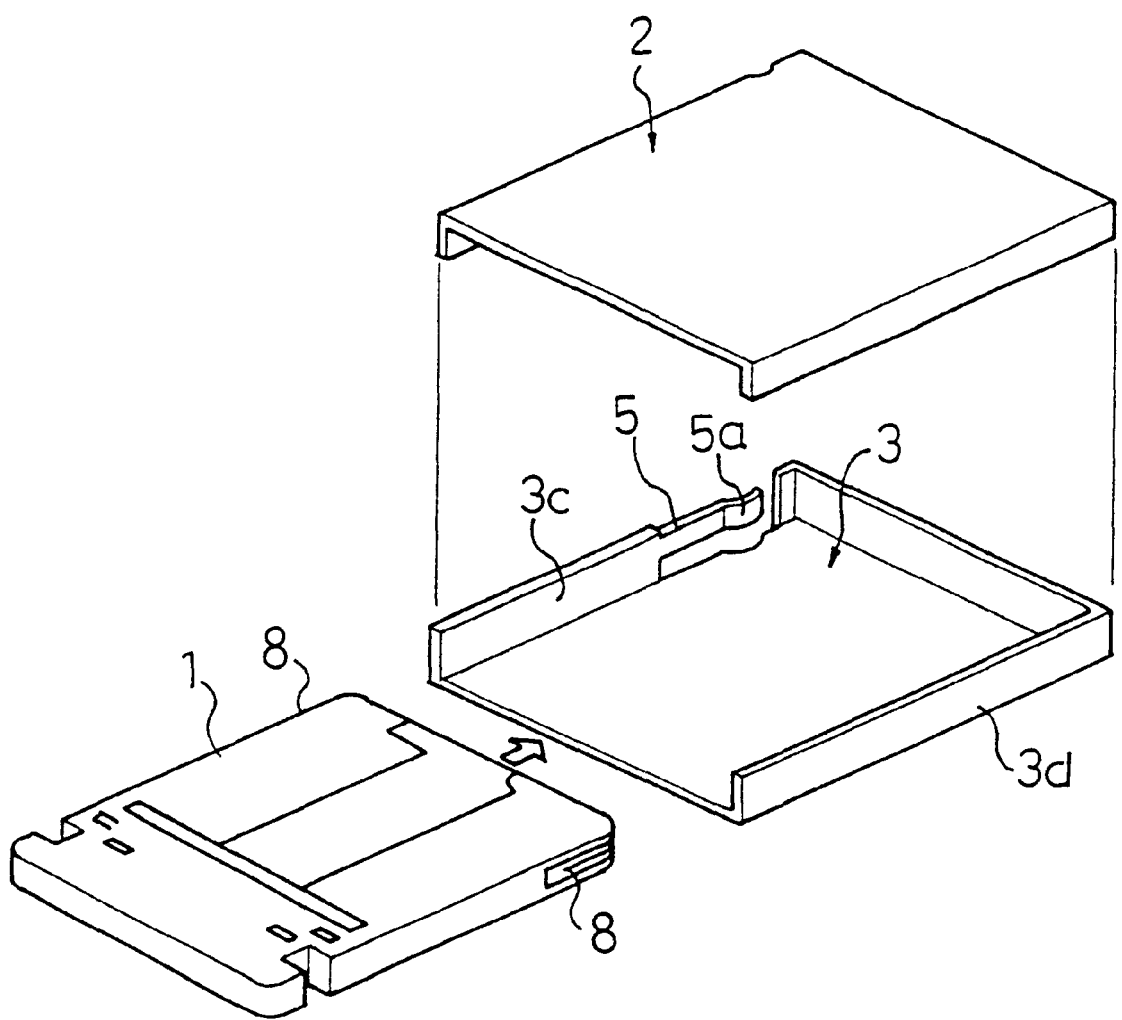
FIG. 1 depicts a perspective view of a conventional case to contain the disk cartridge.
Figure 2:
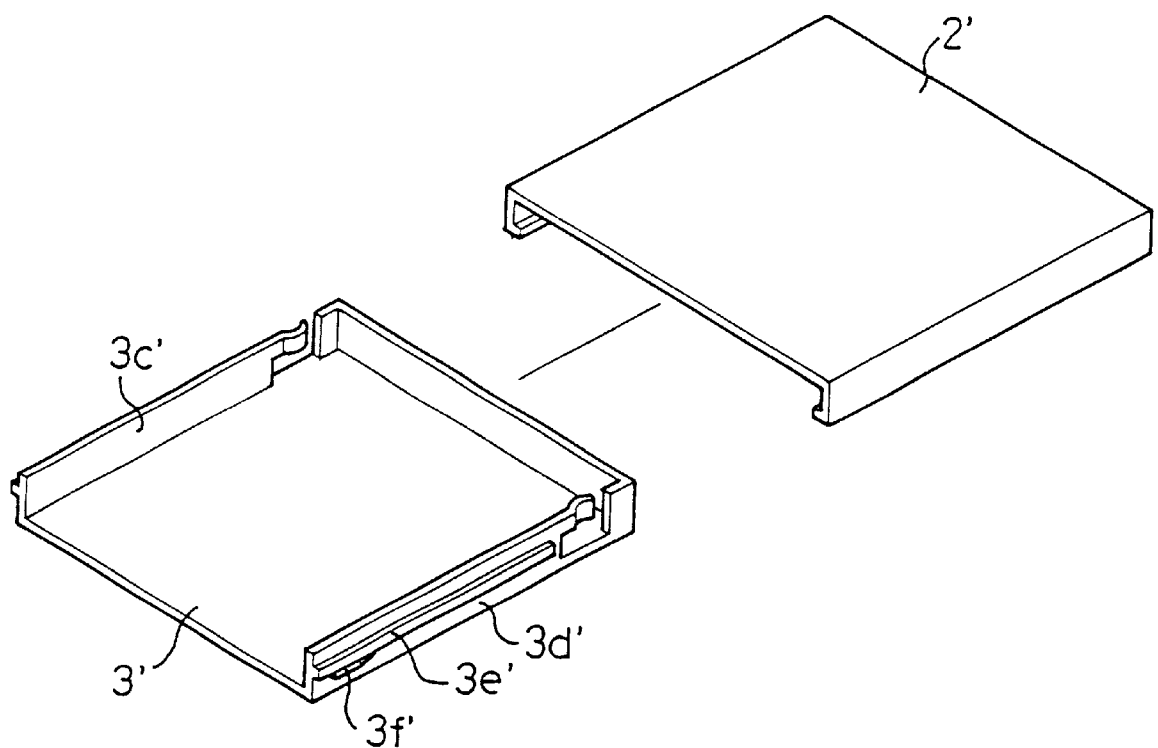
FIG. 2 depicts a perspective view of another conventional case to contain the disk cartridge.

Please refer to FIG. 3; a case of a preferred embodiment according to the present invention comprises an upper case member 10, a lower case member 20, a pivoting mechanism, a fasten mechanism and cartridge retaining means. A disk cartridge 30 is inherently provided with at least one recess formed on a bottom surface thereof, shown in FIG. 3.

The upper case member 10 of the case is made integrally, including a top plate 11 having two opposing edges, a right sidewall 13 and a left sidewall 12, in which the right sidewall 13 and the left sidewall 12 extend from the opposing edges of the top plate 11 and are substantially perpendicular to the top plate 11. Moreover, a pivoting, mechanism dispose on the night sidewall and the left sidewall to pivot the lower case member on the upper case member to form a substantially hollow parallelepiped which defines a chamber therein and has an inserting, opening, such that the disk cartridge is adapted to be inserted through the inserting opening and received in the chamber. The pivoting mechanism has two pivoting members, in which one of the pivoting members has a pin 13b disposed on the right sidewall 13 of the upper case member 10 and a hole 23b formed on the night sidewall 23 of the lower case member 20, and the other pivoting member has a pin 12b disposed on the left sidewall 12 of the upper case member 10 and a hole 22b formed on the left sidewall 22 of the lower case member 20. Therefore the pins of the left and right sidewalls are adapted to be inserted into the holes of the left and right sidewalls, respectively, such that the upper case member pivots, with respect to the lower case member, about the pins.

The lower case member 20 of the case is also made integrally, the including a bottom plate 21 having two opposing edges, a right sidewall 23 and a left sidewall 22, in which the right sidewall 23 and the left sidewall 22 extend from the opposing edges of the bottom plate 21 and are substantially perpendicular to the bottom plate 21. Moreover, a fastening mechanism, disposed between the upper case member and the lower case member to retain the upper case member with the lower case member. In addition, the fastening mechanism have two tab 12a and 13a extending from the right sidewall 13 and the left sidewall 12 of the upper case member 10, and two groove 22a and 23a formed on the right sidewall 23 and the left sidewall 22 of the lower case member 20, such that the tabs 12a, 13a correspondingly engages in the grooves 22a, 23a.

To retain the disk cartridge 30 in the case of the present invention, cartridge retaining means 25a and 25b (not shown in figure) are disposed on the bottom plate 21. The structure of cartridge retaining means 25a is and that of 25b are the same; herein only the wedging means 25a is described. The cartridge retaining means 25a have at least one arm 25a1 resiliently biasing upward, the arm 25a1 having two opposing ends with one end thereof extending from the bottom plate 21 of the lower case member 20 and the other end provided with a protrusion 25a2. The bottom plate 21 is formed with a concave portions 21a to receive the arm 25a1; the arm 25a is integrally formed with the bottom plate 21 at the end extending therefrom. The remaining portion of the arm 25a1, which is not integrated with the bottom plate 21, has a gap with the bottom plate 21, so that the arm 25a1 can flip resiliently. Therefore, when the disk cartridge 30 is completely inserted into the chamber of the case, the protrusion 25a2 is adapted to be allocated in the recess 31 formed on the bottom surface of the disk cartridge, whereby securely positioning the disk cartridge in the case. FIG. 4 further depicts a sectional view of the case, in which the disk cartridge is inserted.

The distance between the left sidewall 12 and right sidewall 13 of the upper case member 10 is slightly smaller than that of the lower case member 20. The length of the rear sidewall 14 of the upper case member 10 is also smaller than that of the lower case member 20. Thus, the upper case member 10 can be accommodated in the lower case member 20 as the upper case member and the lower case member are joined.

When joining the upper case member with lower case member, the left and the right sidewalls will be twisted, so that the pins 12b and 13b of the pivoting mechanism can be engaged with the holes 22b and 23b, respectively, shown as the arrow I of FIG. 3. Then, the upper case member 10 is pivoting on the pivoting mechanism and joined with the lower case member 20 by engaging the tabs 12a, 13a with the 22a, 23a of the fasten mechanism, shown as the arrow II of FIG. 3. That is, the upper case member 10 and the lower case member 20 can be joined and positioned easily only if the pins 12b and 13b have been engaged with the holes 22b and 23b. Moreover, the automation process can be simplified and the case can be assembled after molding.

Moreover, the width of the arm according to the present invention will not be limited by the height of the sidewall, so that the arm of the present invention has stronger strength and resilience. The disk cartridge will be pushed by the arms and positioned by the protrusions of the cartridge retaining means. Even if one of the arms of the cartridge retaining means is broken, the disk cartridge still can be positioned in the case by another arm. Therefore, the disadvantage of the prior art is avoided, which cannot position the disk cartridge in the case if any one of the arms is broken.

The methods and features of this invention have been sufficiently described in the above examples and descriptions. It should be understood that any modifications or changes without departing from the spirits of the invention are intended to be covered in the protection scopes of the invention.

What is claimed is:

1. A case for containing a disk cartridge, in which the disk cartridge is inherently provided with at least one recess formed on a bottom surface thereof, the case comprising:
   an upper case member;
   a lower case member;
   a pivoting mechanism pivoting the lower case member on the upper case member to form a substantially hollow parralledpiped which defines a chamber therein and has an inserting opening, such that the disk cartridge is adapted to be inserted through the inserting opening and received in the chamber;
   a fastening mechanism, disposed between the upper case member and the lower case member to retain the upper case member with the lower case member;
   cartridge retaining means, having at least one arm resiliently biasing upward, the at least one arm having two opposing ends with one end thereof extending from a bottom plate of the lower case member and the other end provided with a protrusion;
   when the disk cartridge is completely inserted into the chamber of the case, the protrusion is adapted to be allocated in the recess formed on the bottom surface of the disk cartridge, whereby securely positioning the disk cartridge in the case.

2. The case for containing a disk cartridge according to claim 1, wherein the upper case member includes a top plate having two opposing edges, a right sidewall and a left sidewall, in which the right sidewall and the left sidewall extend from the opposing edges of the top plate and are substantially perpendicular to the top plate; and wherein the lower case member includes the bottom plate having two opposing edges, a right sidewall and a left sidewall, in which the right sidewall and the left sidewall extend from the opposing edges of the bottom plate and are substantially perpendicular to the bottom plate.

3. The case for containing a disk cartridge according to claim 2, wherein the pivoting mechanism has two pivoting members, in which one of the pivoting members has a pin disposed on the right sidewall of the upper case member and a hole formed on the right sidewall of the lower case member, and the other pivoting member has a pin disposed on the left sidewall of the upper case member and a hole formed on the left sidewall of the lower case member;
   thereby the pins of the left and right sidewalls are adapted to be inserted into the holes of the left and right sidewalls, respectively, such that the upper case member pivots, with respect to the lower case member, about the pins.

4. The case for containing a disk cartridge according to claim 3, wherein the fastening mechanism includes at least one tab extending from at least one of the right sidewall and left sidewall of the upper case member, and at least one groove formed on at least one of the right sidewall and the left sidewall of the lower case member, such that the at least one tab correspondingly engages in the groove.

5. The case for containing a disk cartridge according to claim 4, comprising two arms resiliently biasing upward, wherein the bottom plate is formed with two concave portions receiving the two arms, respectively; each of the two arms being integrally formed with the bottom plate at the end extending therefrom.

\* \* \* \* \*